Nov. 16, 1937.    F. L. HENNING ET AL    2,099,563

PRESSURE RESPONSIVE MIXING VALVE

Filed Feb. 11, 1935    2 Sheets-Sheet 1

Inventors
Francis L. Henning
George W. Bezanson
by Wright, Brown, Quinby May
Attys.

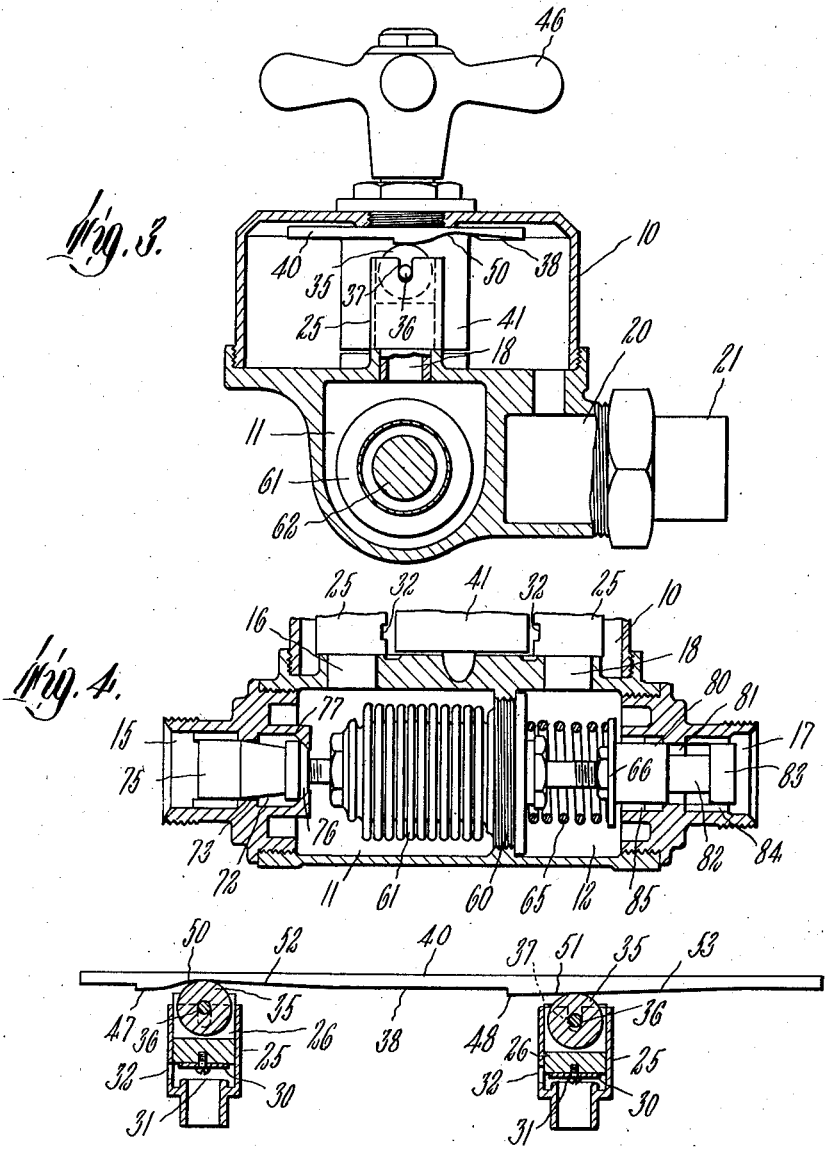

Patented Nov. 16, 1937

2,099,563

UNITED STATES PATENT OFFICE 2,099,563

PRESSURE RESPONSIVE MIXING VALVE

Francis L. Henning, Boston, and George W. Bezanson, Winchester, Mass.; said Henning assignor to said Bezanson Application February 11, 1935, Serial No. 5,976

1 Claim. (Cl. 277—18)

This invention relates to water-mixing valves for regulating and proportioning the mixture of two streams of water of different temperature so as to deliver a mixed stream at any desired intermediate temperature. An object of the invention is to provide a mixing valve which will be positively anti-scald, and which will provide under ordinary conditions of service a stream of substantially constant temperature.

Pressures at the delivery ends of hot and cold water pipes are constantly subject to considerable fluctuation. This is particularly noticeable in dwellings having water-supply systems connected to the water main by a single pipe of ordinary size. According to common experience, the opening of a faucet in such systems will materially reduce and may even stop a stream flowing from another faucet. For example, if a faucet in the cellar of a house is opened when a stream is being drawn from a faucet on the second floor, the pressure of the latter stream will be diminished so that the flow may be reduced, stopped or reversed. If a shower bath is being taken, the opening of a faucet elsewhere in the house will change the proportion of mix in the hot and cold water supply to the shower and will thus change the temperature of the shower. Such changes may result in the delivery of dangerously hot water if the cold water pressure fails entirely as it often does. To meet this difficulty, various automatic thermostatically-controlled mixing valves have been devised to respond to changes of temperature in the mixed stream. Such valves are valuable for certain uses but are subject to a lag in their response to changes of temperatures since heat must be transferred from the stream to the thermostatic element before the latter can act.

It is an object of the present invention to provide a self-regulating mixing valve which is responsive to changes in the pressures of the streams supplied thereto, and which therefore acts instantly when the pressure in either the hot or cold water supply changes. It is another object of the invention to provide means acting to cut off the hot water supply completely when the cold water pressure fails. It is a further object of the invention to provide compact, efficient cam means for the manual regulation of the proportioning valves which control the admission of hot and cold water into the mixing chamber. It is a further object of the invention to provide simple, accessible means for adjusting the valve for the available service water pressure after the valve has been installed.

Other advantageous features will be apparent to one skilled in the art from the disclosure of the invention in the following description of an embodiment thereof, and on the drawings, of which—

Figure 3 is a section on the line 3—3 of Figure 2.

Figure 4 is a sectional view of the automatic portion of the valve, showing the moving parts in different positions from those shown in Figure 2.

Figure 5 is a development of the valve-operating cam, the control valves being shown in section.

Figure 1:
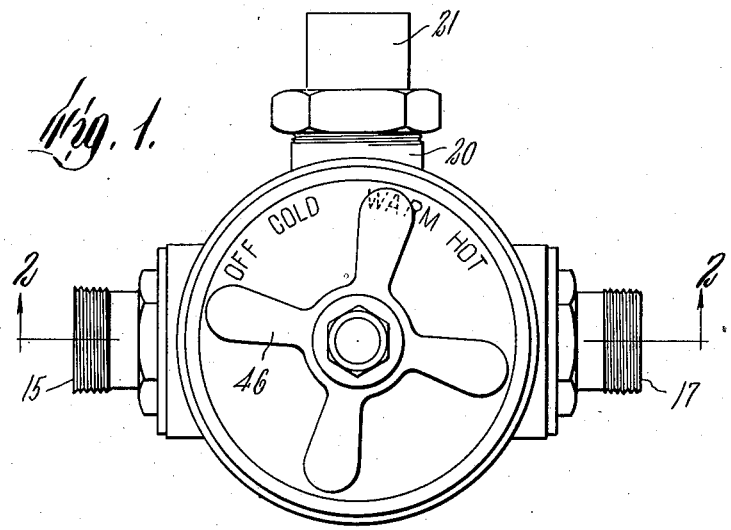
Figure 1 is a front elevation of a valve embodying the invention.
Figure 2:
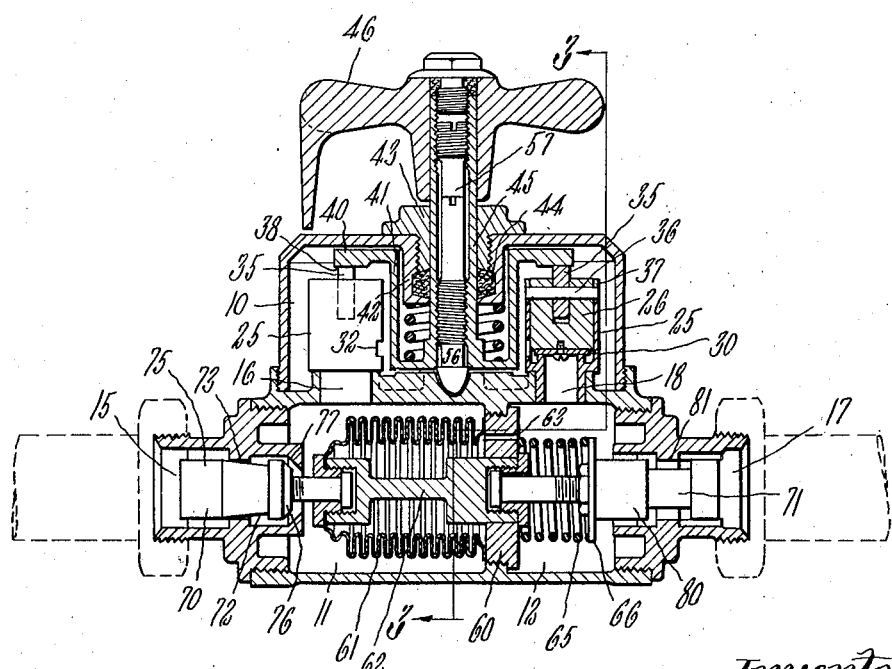
Figure 2 is a section on the line 2—2 of Figure 1.

As indicated in Figures 1 and 2, the valve may comprise a casing consisting of any suitable number of parts assembled together, this casing enclosing a mixing chamber 10 and a pair of antechambers 11 and 12. The antechamber 11 is provided with an inlet 15 and an outlet 16, the latter opening into the mixing chamber 10. The antechamber 12 is provided with an inlet 17 and an outlet 18, the latter opening into the mixing chamber 10. Thus the antechambers 11 and 12, together with their respective inlets and outlets, constitute passages for hot and cold water connecting the respective supply pipes with the mixing chamber 10. The mixing chamber is provided with an outlet member 20 adapted to be connected to a pipe 21 for the delivery of mixed hot and cold water to a shower fitting or elsewhere.

The proportioning of the streams of hot and cold water which enter the mixing chamber 10 is manually controlled through a pair of valve mechanisms which are adapted to shut off the outlets 16 and 18 which open into the mixing chamber. These control valves and their operating mechanism may be of any preferred construction. As shown, each valve mechanism may comprise a cylindrical casing 25 in which a plunger 26 is slidable, this plunger having on its inner end a valve element 30 adapted to engage a valve seat 31 at the orifice of the hot or cold water outlets 16 and 18. The side wall of each cylinder 25 is provided with one or more ports 32 to admit into the mixing chamber the water which passes the clearance between the valve element 30 and its seat 31. Each plunger 26 may be provided with a wheel 35 at its outer end mounted on an axle 36, the projecting ends of which ride in a pair of notches 37 in the outer end of the cylinder 25. The wheels 35 are cam followers and bear against a circular cam face 38 which may be formed on a member 40. This member is circular and has an inwardly projecting, cup-shaped portion 41 to make room for a stuffing-box 42 which is integral with the casing. The box 42 contains suitable packing 44 which is compressed by a follower 43 in the usual manner. From the center of the cam member 40 a hollow operating shaft 45 projects out through the box 42 and follower 43. A handle 46 is mounted on the outer end of the shaft 45 and is operable to rotate the cam member 40. The profile of the circular cam face 38 is shown in Figure 5 as a straight development. Half of this cam is adapted for engagement with the hot water valve mechanism, the other half being adapted for engagement with the cold water valve mechanism. Thus the total operating rotation of the handle 46 is a little less than 180°. As indicated in Figure 5, the cam member 40 is provided with two high points 47, 48, located at diametrically opposite points. The valve casings 25 are so adjusted with reference to the cam member 40 that, when the wheels or rollers 35 are on the high points 47 and 48, the valve elements 30 are tightly pressed against their respective valve seats 31. When the handle 46 is turned so as to turn on the water, the cold water valve roller 35 rolls off the high point 47 to a depression 50, thus opening the cold water valve 30 to its maximum. The hot water valve roller 35, on the other hand, rolls along a portion 51 of the cam surface which recedes gradually from the high point 48, so that, while the cold water valve 30 is opening to its widest extent, there is little or no opening of the hot water valve. Further rotation of the handle 46 results in movement of the cold water valve roller 35 along a gradually rising portion 52 of the cam which has the effect of gradually closing the cold water valve. At the same time the hot water valve roller 35 rides along a gradually descending portion 53 of the cam, this resulting in a gradual opening of the hot water valve while the cold water valve is gradually closing. Thus the rotation of the handle 46 from its shut position results first in opening the cold water valve wide, then gradually closing the cold water valve as the hot water valve opens, so that the further the handle is turned the greater will be the proportion of hot water in the mixture, hence the higher the temperature of the mixture. In actual practice, each valve is adjusted to local pressure conditions where it is to be employed, so that it will be impossible to turn on an excessive proportion of hot water which might result in dangerously high temperatures. To this end, the member 40 is adapted to yield outwardly but is pressed toward the cam-followers 35 by a spring 55 which is seated within the cup-shaped portion 41 of the member 40 and which is of sufficient stiffness to overcome the pressure of water against the valves 30. To facilitate adjustment of the valve, the cam member 40 may be provided with a central bearing element 56 which, as shown in Figure 2, is disposed within the hollow shaft 45 and is in threaded engagement therewith for longitudinal adjustment. The bearing element may be locked in any position of adjustment by a locking element 57 which may be set up tightly against its outer end. Ordinarily the adjustment of the bearing element is such that it is clear of its seat when the valve is fully closed, the whole member 40 being lifted as the cam followers 35 ride on the high points 47 and 48 of the cam. When the cam member 40 is rotated, the bearing element 56 moves inward as the rollers 35 ride off the high points of the cam surface until it engages its seat. During the remainder of the valve-opening movement of the member 40, the movements of the valves 30 are controlled solely by the contour of the cam surface 38. Since the portions of the cam surface 38 for controlling the hot and cold water valves, respectively, have different contours, changes in the adjustment of the bearing element 56 will have different effects in the operation of the two valves 30 so that the functioning of the mixing valve as a whole may thus be altered by such adjustments.

In addition to the manually-operable means for proportioning the streams of hot and cold water entering the mixing chamber 10, automatic pressure-controlled mechanism is provided for the purpose of compensating for accidental variations in the pressures of the hot and cold water supplies. According to the invention, the automatic apparatus responds to changes in pressure in the hot or cold water supply, so that, in case of substantial failure of pressure in the cold water supply, the stream of hot water will be instantly reduced or cut off entirely so that the possibility of delivery of scalding water from the device is entirely obviated.

As indicated in Figures 2 and 4, the antechambers 11 and 12 are separated by a partition member 60 to which is secured one end of a bellows 61, the bellows being disposed in the hot water antechamber 11. A stem 62 is attached to the free end of the bellows and slidably projects through the partition member 60. This partition member may be provided with one or more apertures 63 through which the pressure of the fluid in the antechamber 12 is communicated to the interior of the bellows 61, the exterior of the bellows being exposed to fluid pressure in the antechamber 11. In order to maintain the bellows normally in a balanced condition so as to be capable of movement in either direction by changes of pressure, the bellows may be partly contracted by a spring 65 which, as shown in Figure 2, may bear against the partition member 60 at one end and against a suitable disk 66 carried by the stem 62. Attached to the opposite ends of the stem 62 are a pair of valve elements 70 and 71 for controlling the hot and cold water inlets respectively. The valve elements 70 and 71 are movable simultaneously with the stem 62 when the bellows 61 expands or contracts in response to pressure conditions in the antechambers. It is desirable, in case of small decreases in the pressure of the cold water supply, to reduce the hot water stream proportionately. To this end, the valve element 70 is provided with a tapering portion 72 which cooperates with a cylindrical bore 73 in the hot water inlet. It is evident from Figure 2 that, as the valve member 70 moves toward the right in response to an increase in hot water supply pressure or a decrease in cold water supply pressure, the clearance between the taper portion 72 of the valve and a bore 73 will be gradually diminished as the valve moves toward the right so that the decrease in the stream of hot water admitted into the antechamber 11 will be roughly proportional to the distance of movement of the valve. The taper portion 72 of the valve member 70 adjoins a cylindrical portion 75 which has a diameter substantially equal to that of the bore 73, so that, when the cylindrical portion 75 of the valve begins to enter the bore 73, the stream of hot water is substantially cut off. However, with a valve of this type, a certain amount of leakage is practically unavoidable since sufficient clearance must be allowed to take care of thermal expansion and contraction of the valve member and casing, such leakage being usually substantial, especially after the valve has become worn. It is desirable to stop the flow of hot water completely upon failure of the cold water pressure. To this end, the valve member 70 is provided with a beveled portion 76 adapted to seat against a beveled seat 77 after the manner of a poppet valve, thus cutting off completely the leakage of hot water past the valve element 75 after it has entered the bore 73 to shut off the hot water stream. The cold water valve consists of a cylinder 80 which is adapted to enter a cylindrical bore 81 in the cold water inlet. If desired, the valve member 80 may have a reduced extension 82 with a cylindrical end member 83 sliding on longitudinal ribs 84 as a guide member. The valve member 80 may also slide on guide ribs 85 in the inlet passage so as to keep it centered. The entering end of the valve member 80 approaches the bore 81 during the closing movement of the hot water valve and starts to enter the bore just after the hot water valve member 75 enters the bore 73. As the cold water valve member 80 approaches the adjacent end of the bore 81, there is sufficient clearance between the valve and the end of the bore to permit considerable flow of water through the inlet until the valve member nearly reaches the bore. Then the flow of cold water is shut off comparatively suddenly, the valve, however, being subject to some leakage since in order to work freely a clearance must be allowed between the valve member 80 and the wall of the bore 81.

During the ordinary operation of the valve, the balance between the bellows 61 and the spring 65 is such as to maintain the water pressure in the two antechambers substantially equal, the proportion of flow between the two streams being manually regulated by adjustment of the valves 30 through manipulation of the handle 46. If there should be a slight drop in the cold water supply pressure, an instant contraction of the bellows 61 occurs, moving the stem 62 and the valve members 70 and 80 toward the closed position, this motion being of sufficient amount to reduce the hot water stream passing the tapered portion 72 of the valve 70 until the pressures in the chambers 11 and 12 are equalized. A small motion of the valve 80 toward the right has a negligible effect on the flow of the cold water stream owing to the ample clearance between the adjacent edges of the valve member 80 and the bore 81. If the cold water pressure substantially or entirely fails, as it often does in domestic water supply systems, the pressure of the hot water on the bellows 61 moves the valves all of the way over to their closed position. In reaching this position, the hot water valve 75 is the first to close. This cuts off the hot water stream, except for leakage, so that the excess pressure on the bellows 61 is at once relieved. The supply pressure, however, acts on the end surface of the valve member 70 to complete the movement of the valve members to their closed positions. The reduction of pressure in the chamber 11 resulting from the closing of the valve member 75 prevents the poppet valve 76 from slamming against its seat 77. Instead, the poppet valve 76 is gently but firmly pressed against its seat so as to cut off the leakage past the valve 75. Between the closing of the valve 75 and the valve 76, the cold water valve 80 reaches its closed position as its end enters the bore 81. Thus a failure of the cold water supply results in a substantial shutting off of both hot water and cold water streams, except for cold water leakage past the valve 80. The valve is held in this closed position by hot water pressure against the end of the valve member 70. When cold water pressure is restored, the pressure on the end of the cold water valve, combined with the restoring force of the compressed bellows 61, moves the spindle 62 with the valves 70 and 80 toward the left, as in Figure 2, thus opening both the hot and cold water valves.

We claim:—

A hot and cold water mixing device having a passage for cold water and a passage including a valve chamber for hot water, a valve in said chamber, and a cylindrical bellows having an end head connected to said valve for actuation thereof, one surface of said end head being exposed to said hot water passage on the discharge side of said valve, the other surface of said end head being exposed to said cold water passage, said valve having a poppet portion adapted to seat at the discharge end of said chamber movable to close said hot water passage tightly and a tapered portion toward the inlet end of the chamber movable to reduce the flow gradually and substantially to close the passage before the poppet portion reaches its seat.

FRANCIS L. HENNING.
GEORGE W. BEZANSON.